United States Patent [19]
Koehn et al.

[11] 3,913,934
[45] Oct. 21, 1975

[54] VARIABLE WIDTH HIGHWAY TRAILER

[76] Inventors: Franklin E. Koehn, P.O. Box 296, Denair, Calif. 95316; Robert N. Esau, 1548 2nd St., Livingston, Calif. 95334; Le Vern D. Jantz, 6674 N. Cypress St., Winton, Calif. 95388

[22] Filed: Feb. 14, 1973

[21] Appl. No.: 332,372

[52] U.S. Cl. ............................... 280/34 A; 214/85
[51] Int. Cl.² ........................................ B62B 11/00
[58] Field of Search .......... 280/34 R, 34 A, 81 A, 280/104.5 A

[56] References Cited
UNITED STATES PATENTS

| | | | |
|---|---|---|---|
| 2,759,201 | 8/1956 | McKinney | 280/34 R |
| 2,936,034 | 5/1960 | Lely | 280/34 R |
| 3,264,009 | 8/1966 | Langendorf | 280/81 A |
| 3,698,734 | 10/1972 | Drake | 280/34 R |

*Primary Examiner*—Robert R. Song
*Attorney, Agent, or Firm*—Vergil L. Gerard

[57] ABSTRACT

Disclosed is a highway trailer the width of which can be varied from special haul width to normal haul width. The trailer is adapted for pulling by relatively lightweight vehicles including pickup trucks and is capable of hauling farm and construction machinery. The trailer has four wheels to carry heavy loads, but can also be made with two wheels for light loads. Wheel ramps are provided for drive on loading of mobile equipment, and adjustment for width variation can be readily achieved by one man without special equipment.

7 Claims, 12 Drawing Figures

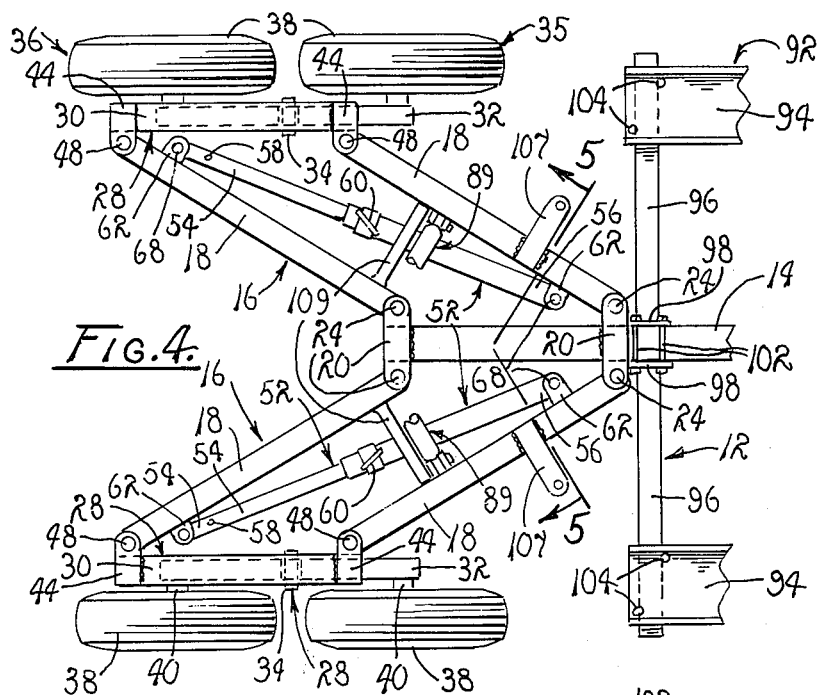
Fig. 4.
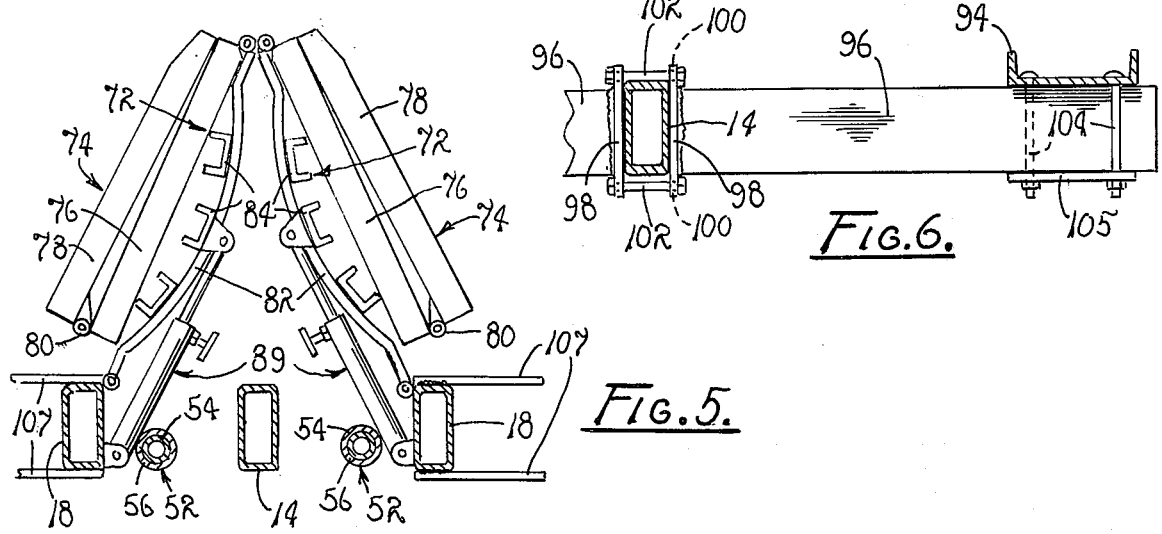
Fig. 5.
Fig. 6.
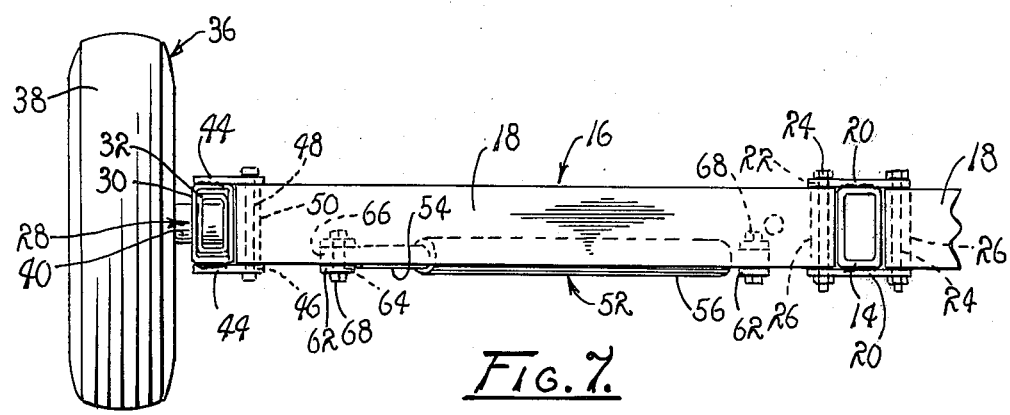
Fig. 7.

VARIABLE WIDTH HIGHWAY TRAILER

BACKGROUND OF THE INVENTION

This invention relates generally to highway trailers suitable for pulling by relatively lightweight vehicles, and particularly to trailers adapted to hauling farm and construction machinery.

Frequently farm and construction machinery, even when they are mobile and self propelled, cannot be driven on the highway, primarily because of their size and relatively slow speed. It is, therefore, common for such equipment to be carried to and from the place of use on trailers. Often it is desirable for trailers used for this purpose to be suitable for pulling by relatively lightweight vehicles, such as a pickup truck.

A variety of trailers have been devised for this purpose, however, laws pertaining to widths of loads permitted on the highways frequently restrict their use and make hauls of this type unnecessarily expensive. In most states, for instance, there are laws forbidding the hauling of loads on the highway over a normal width, usually eight feet, without a special permit requiring compliance with certain specified conditions.

Since numerous types of farm and construction machinery exceed the allowable normal width, special haul permits are required to move this machinery. The trailers previously developed for moving such machinery also have widths greater than the normal allowable highway load width and cannot be moved on the highways even when unloaded. Therefore, after a piece of oversize machinery has been hauled to its place of intended use, the trailer cannot be towed elsewhere empty but must be left with the machine. Obviously, this greatly restricts the use of these trailers.

A need, therefore, exists for a highway trailer which is wide enough to handle special haul machinery and equipment and yet can be reduced in size to normal allowable vehicle width when unloaded and towed on the highway. It is, therefore, a major object of my invention to provide a highway trailer for transporting large machinery and equipment which is variable in width.

OBJECTS AND ADVANTAGES

It is also an important object of my invention to provide a highway trailer of the type described which is capable of being pulled by lightweight vehicles such as a pickup truck.

It is another object of my invention to provide a highway trailer of the type described in which loading ramps are provided for drive on loading and drive off unloading of mobile machinery and equipment.

It is a further object of my invention to provide a highway trailer of the type described which can be made with four wheels for heavier loads or with two wheels for lighter loads.

It is still another object of my invention to provide a trailer of the type described in which the width of the trailer can be varied by one man with a minimum amount of effort and no special tools.

It is still a further object of my invention to provide a highway trailer of the type described which can be readily adapted to various types of machinery and equipment.

It is yet another object of my invention to provide a highway trailer of the type described which can be economically manufactured, readily adapted to various types of mobile machinery.

These and other objects and advantages of my invention will become more readily apparent from a following detailed description of preferred embodiments and the accompanying drawings in which:

DRAWINGS

FIG. 4 is a partial plan view of the trailer shown in FIG. 1 in which the trailer wheels have been drawn inwardly to minimize the trailer's width;

FIG. 5 is a sectional view taken on line 5—5 in FIG. 4, particularly showing the loading ramps of the trailer;

FIG. 6 is a sectional view taken on line 6—6 in FIG. 3, particularly showing the forward bed portion of the trailer;

FIG. 7 is a sectional view taken on line 7—7 in FIG. 3, particularly showing the rear frame portion of the trailer;

DETAILED DESCRIPTION OF EMBODIMENTS

Figure 1:
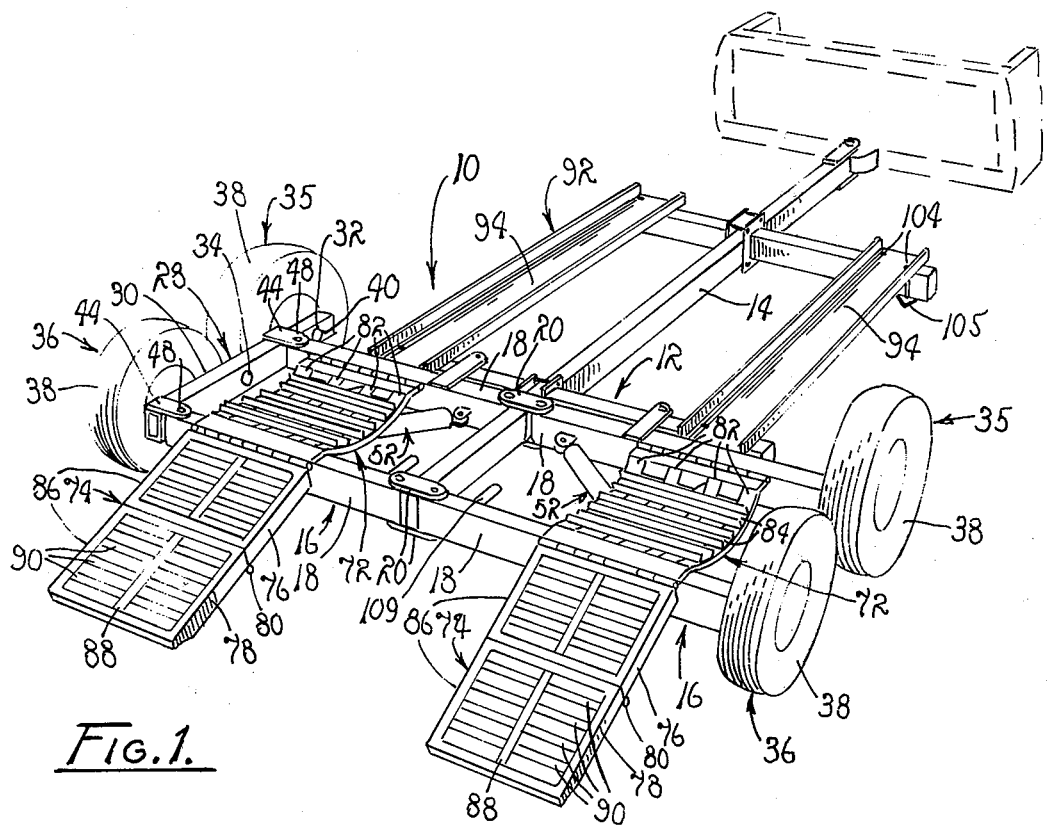
FIG. 1 is a perspective view of a trailer embodying my invention, with a swather positioned on the trailer and a pickup truck pulling it.
Figure 2:
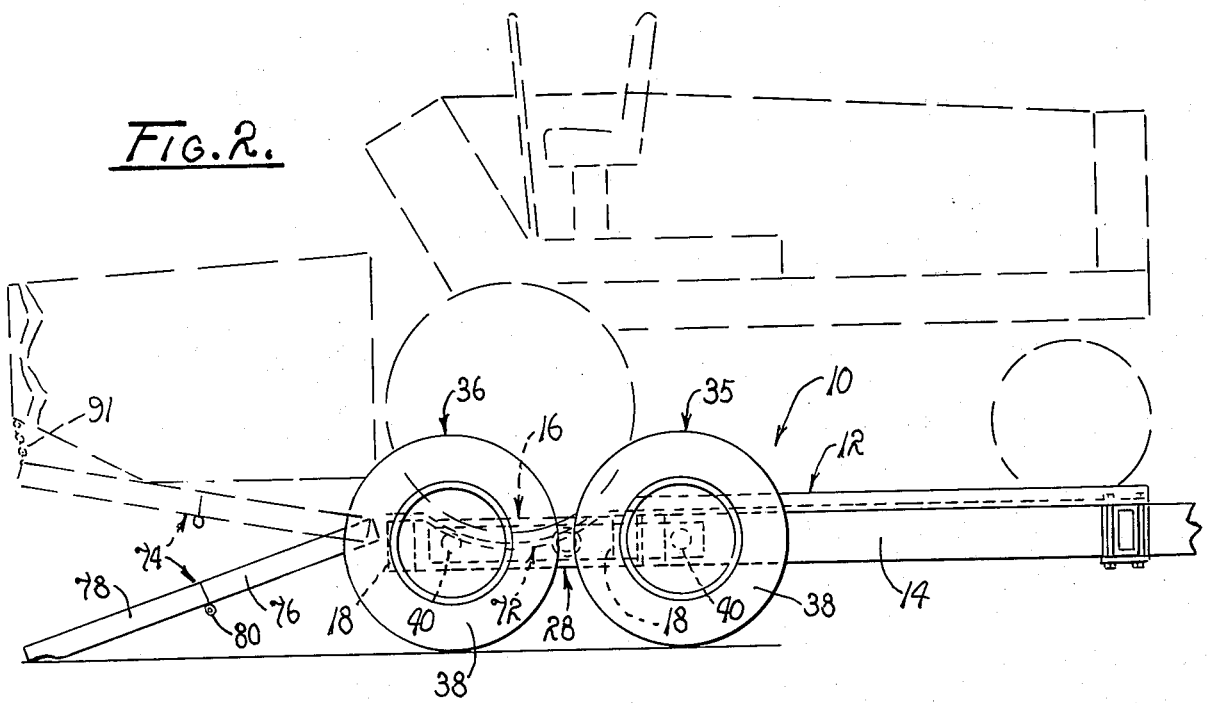
FIG. 2 is a partial side elevational view of the trailer shown in FIG. 1, with the swather positioned on the trailer.
Figure 3:
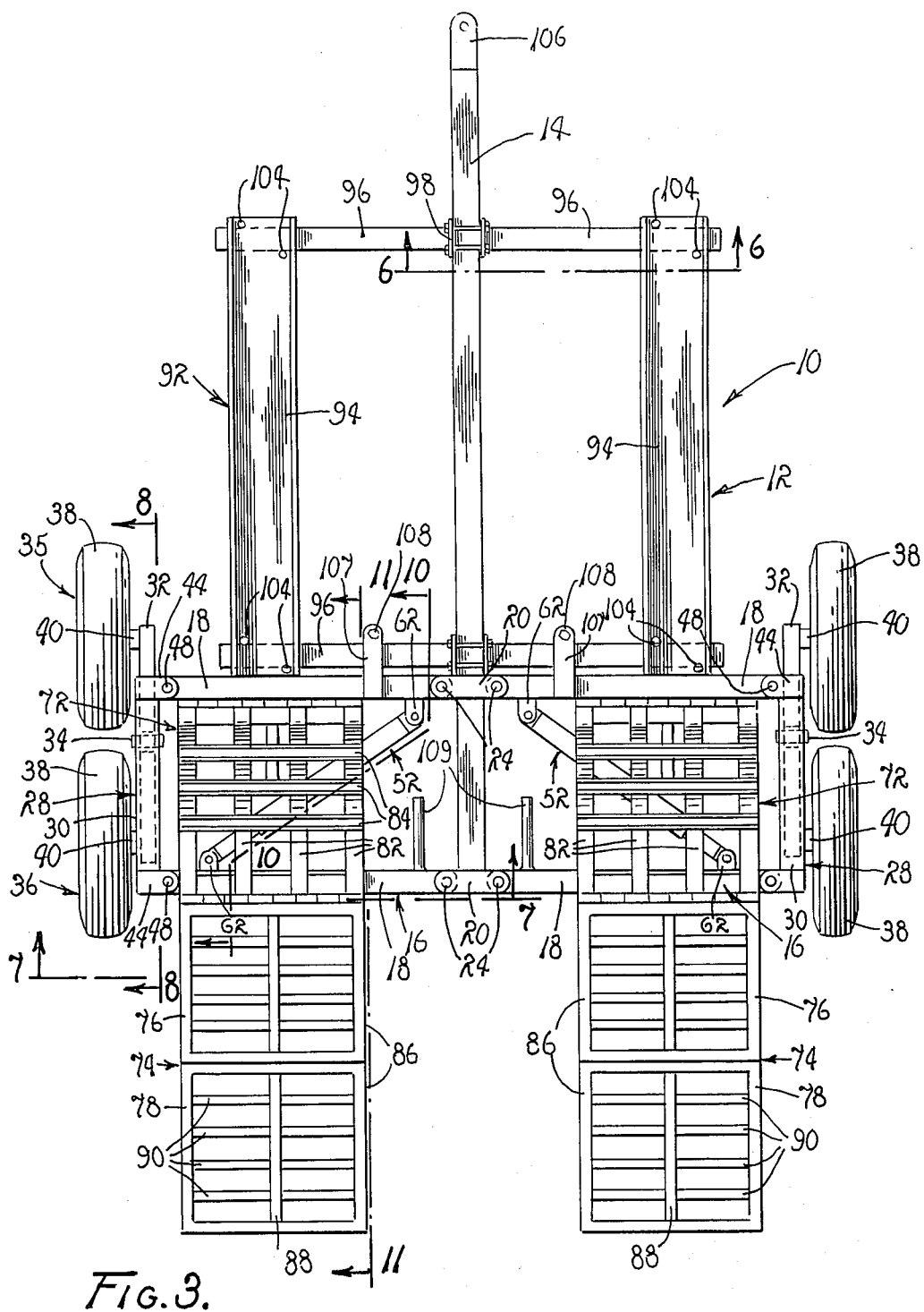
FIG. 3 is a plan view of the trailer shown in FIG. 1.

Referring now to the drawings, and particularly to FIGS. 1 through 4 thereof, the numeral 10 designates my highway trailer generally. The trailer 10 has a frame 12 consisting of a tongue 14 and a lateral sub-frame 16. The lateral subframe 16 consists of two pairs of parallel, laterally extending arms 18, one pair mounted on each side of the rear portion of the tongue 14. The arms 18 are pivotally mounted to the tongue 14 at their proximal ends by means of a pair of clamp members 20. The clamp members 20 extend on each side of the tongue 14 and have aligned pivot pin holes 22 through which a pivot pin 24 is disposed.

The proximal ends of the arms 18 have bushings 26 which fit between the clamp members 22 in alignment with the pivot pin holes 22 and pivotally attach the arms to the tongue 14 when the pivot pin 24 is in place. The arms 18 are attached to the tongue 14 with the forward arms of each pair attached by one set of clamp members 20 and the rearward arms of each pair attached by a second set of clamp members.

Figure 8:
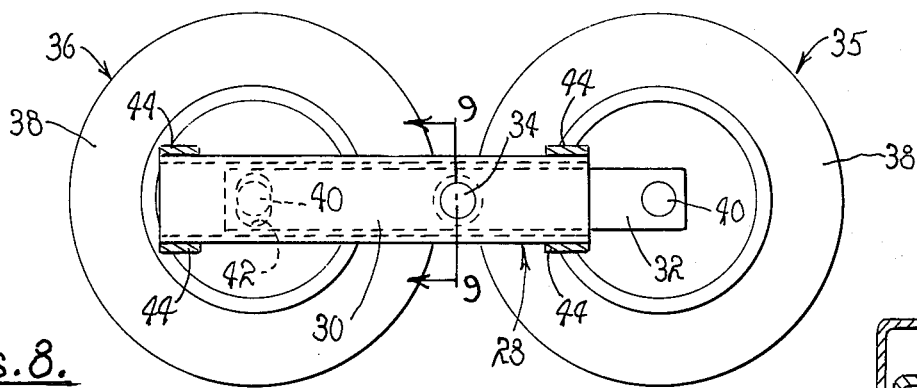
FIG. 8 is a sectional view taken on line 8—8 in FIG. 3, particularly showing the wheel mounting structure of the trailer.
Figure 9:
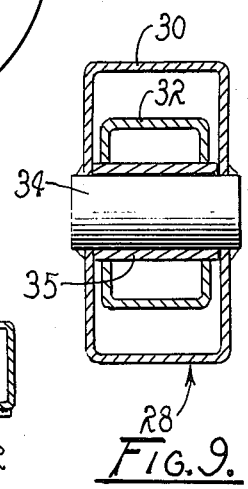
FIG. 9 is an enlarged sectional view taken on line 9—9 in FIG. 8.
Figure 10:
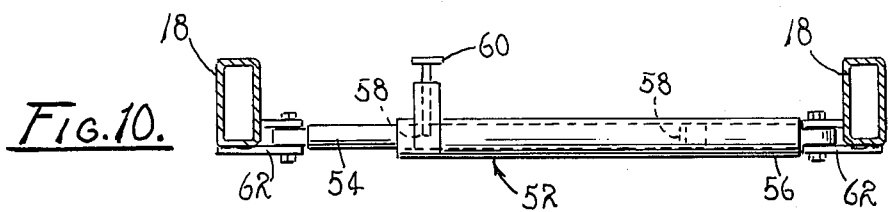
FIG. 10 is a sectional view taken on line 9—9 in FIG. 3, particularly showing retracting structure of the trailer.
Figure 11:
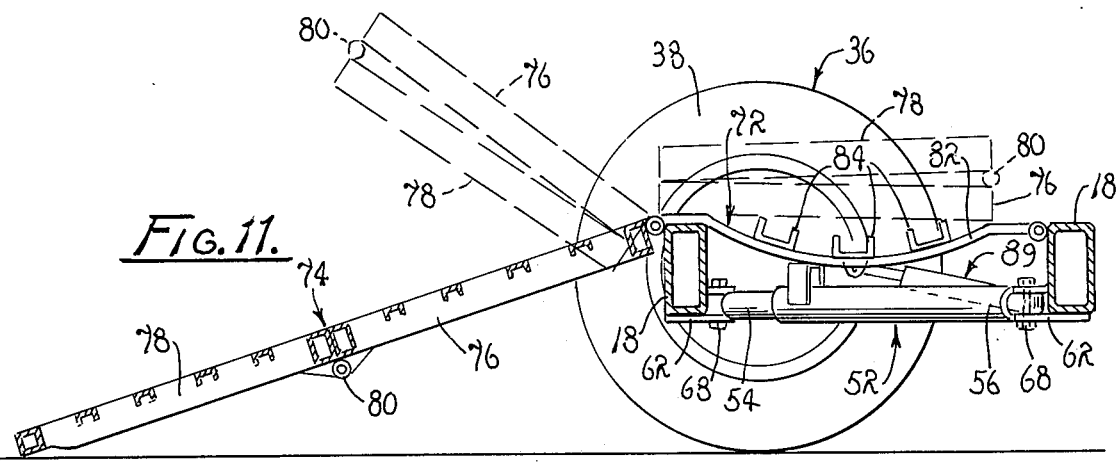
FIG. 11 is a sectional view taken on line 10—10 in FIG. 3, particularly showing the rear bed portion and extended loading ramps of the trailer.
Figure 12:
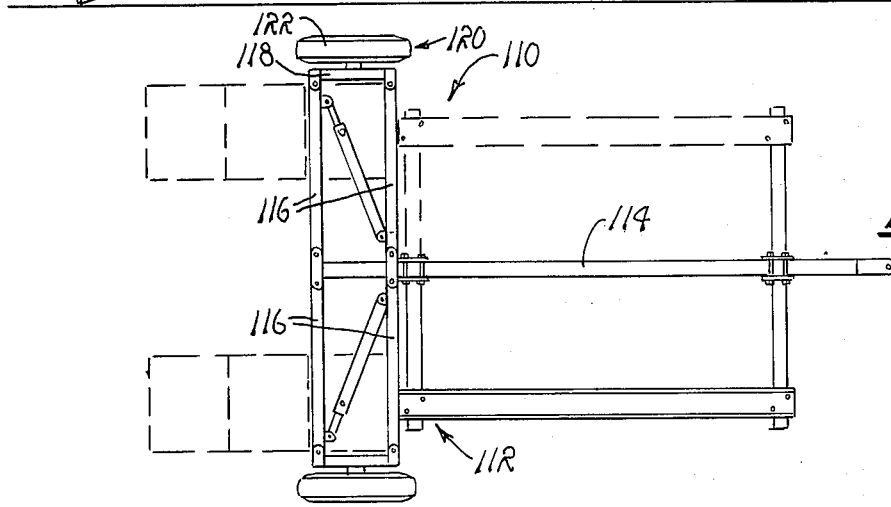
FIG. 12 is a plan view showing a modified form of my trailer which has only two wheels rather than four.

The distal ends of the arms 18 are attached to a wheel support sub-frame 28. As best shown in FIGS. 7, 8 and 9, the wheel support sub-frame 28 consists of two box beams, a chassis box beam 30 and an axle box beam 32. The axle box beam 32 is mounted inside the chassis box beam 30 and the two box beams are connected by a wheel support pivot pin 34 which passes through a sleeve 35 welded in the axle box beam. The wheel support pivot pin 34 passes through the side walls of the chassis box beam and the sleeve 35 in a generally horizontal direction, and permits the axle box beam to pivot vertically a limited distance inside the chassis box beam to provide a walking beam mounting for the running gear. The axle box beam 32 is substantially less in height than the chassis box beam 30 and the beams are telescopically assembled so that the axle box beam projects out of the chassis box beam forwardly, and the chassis box beam extends rearwardly of the axle box beam (see FIGS. 8 and 9).

Forward running gear 35 and rearward running gear 36 are attached to the forward end of the axle box beam and the rearward end of the axle box beam. Each of the running gear consists of a wheel 38 with a stub axle 40. The stub axle 40 of each running gear is affixed in the axle box beam, and the wheel 38 is bearing mounted on the distal end of the stub axle.

Since the rearward end of the axle box beam 32 is enclosed by the chassis box beam 30, an opening 42 is provided in the outer side of the chassis box beam for the axle to pass through. Since the axle box beam 32 is pivotal in the chassis box beam 30, the opening 42 is oblong to permit vertical movement of the rear running gear stub axle 40 with respect to the chassis box beam.

To secure the wheel support sub-frame 28 to the distal ends of the arms 18, two pairs of ears 44 are mounted on the chassis box beam 30, one at each end. Each pair of the mounting ears 44 project inwardly and have aligned distal pivot pin holes 46 through which a distal pivot pin 48 is disposed. The distal ends of the arms 18 have bushings 50 which fit between the pairs of mounting ears 44 and align with the distal pivot pin holes 46 to receive the distal pivot pins 48 and thus pivotally attached the arms to the wheel support sub-frame.

To control the positioning of the pairs of arms 18, and thereby the sets of running gear on each side of the trailer, I provide a pair of telescopically extendable brace members 52. Each of the brace members 52 has an outer end 54 pivotally attached to the rearward arm of each pair near its distal end, and an inner end 56 pivotally attached to the forward arm of each pair near its proximal end. The brace members 52 each have two sets of matched lock pin holes 58, one set of which matches when the arms 18 extend laterally outward normal to the tongue 14 in their most extended position, and the other set of which matches when the arms 18 are pivoted rearwardly, drawing the running gear inward into their retracted position. A spring loaded, releasable lock key 60 is provided which is passed through the matched holes and locked therein to secure the arms in one position or the other.

The pivotal attachment of the brace members 52 with the arms 18 is accomplished by pairs of brace member mounting ears 62 attached to each of the arms in the pair and having aligned holes 64 therethrough. Bushing 66 are mounted on each end of the brace members 52 and fit between the mounting ears 62 and align with the holes 64. Brace member pivot pins 68 are placed through the holes and ears to complete the pivot assembly.

To support equipment disposed on the trailer, such as the swather shown in the drawings, and to permit drive on loading of mobile equipment, a pair of wheel carriages 72 and loading ramps 74 are provided. The wheel carriages 70 are pivotally attached to the forward arms 18 of each pair, at their forward ends, and have their rearward portions supported by the rearward arms of the pair when the arms are in their laterally extended position.

The loading ramps 74 are each hinge connected to the rear portion of a different one of the wheel carriages 72, and consist of two sections, a proximal section 76 and a distal section 78. The loading ramp sections are connecting at their adjoining edges by an elbow hinge 80 which locks in one direction and pivots in the other.

The wheel carriages 72 have longitudinal side members 82 and cross members 84, and the loading ramp sections have two longitudinal side members 86, longitudinal center member 88, and cross members 90.

An extendable arm 89 is provided between the wheel carriages 72 and the rearward arms 18 with a spring loaded, releasable lock pin which functions in the same manner as the extendable brace members 52. The extendable arms 89 support the wheel carriages and loading ramp in their folded positions when the trailer is retracted.

When the trailer 10 is retracted to its narrow width position, the inside rear edges of the wheel carriages engage one another and the wheel carriages are tilted up as shown in FIG. 5. The loading ramp sections fold up onto the wheel carriages when the trailer is not loaded, and are suspended by support chains 91 when equipment is loaded on the trailer. To support equipment on the trailer at the forward portion, a forward load bed 92 is provided. The forward load bed 92 consists of a pair of wheel tracks 94 supported on a pair of forward laterals 96. The laterals 96 are box beams with flanges 98 attached to their inner ends. The flanges 98 are wider than the tongue 14 and have holes 100 in the corners thereof. Bolts 102 are provided which pass through the holes 100 and secure the flanges 98 and laterals 96 on each side of the tongue 14. On their distal portions the laterals 96 support the wheel tracks 94 which are attached to the laterals by diagonally oriented bolts 104, and crossbars 105.

To provide means for attaching the trailer to a pulling vehicle, a hitch coupling 106 is mounted on the forward end of the tongue 14.

To secure the trailer in its extended position, a safety lock is provided consisting of two pairs of parallel, spaced safety ears 107 and pins 108, one on each of the forward arms 18. The safety ears 108 straddle the rearward laterals 96 and are secured to the laterals by the pins 108. To secure the trailer in its retracted position, stops 109 are mounted on the rearward arms 18 and disposed to engage the forward arms 18 when they are pivoted rearwardly to the retracted position.

In my second embodiment, I show a modified form of a trailer 110 having a frame 112 formed of a tongue 114 and lateral members 116. As in my first embodiment the lateral members 116 are pivotally connected with the rear portion of the tongue 114 so they may be swung outward to a position normal to the tongue or rearward about the pivot to a retracted position which narrows the distance between the running gear. Wheel support sub-frames 118 are single box beams and are mounted on the distal ends of the lateral members 116 as in the first embodiment, however, the running gear 120 consists only of a single wheel 122 and stub axle 124 on each side of the trailer.

The principal difference between the first and second forms of the invention is that the second form utilizes only two wheels, one on each side, whereas the first embodiment utilizes two wheels on each side and can, therefore, handle loads with greater weight.

OPERATION

Having described in detail a preferred embodiment of the invention, it will be understood that its operation is as follows. The trailer 10 is attached to a pulling vehicle by means of the hitch coupling 106, and where mobile equipment is to be loaded the loading ramps 74 are lowered and extended. The equipment is then driven onto the trailer with the forward wheels supported by the forward load bed 92 and the rear wheels supported by the wheel carriages 72.

For this operation, the lateral sub-frames 16 are extended so that arms 18 are substantially normal to the tongue 14. The brace members 52 are in their retracted positions and locked by lock key 60 being disposed in the retracted position matched pair of lock pin holes 58, and the forward arms 18 are secured to the rearward laterals by the ears 107 and pins 108.

With the equipment loaded, the trailer is ready for movement and the loading ramps 72 are retracted by folding their distal sections 78 upon their proximal sections 76 and supporting them above the ground by means of the support chains.

When the equipment has been transported as desired, and unloaded, the trailer can be retracted to normal vehicle width by merely removing the lock keys 60 from each of the brace members and then drawing the tongue forwardly with the pulling vehicle. As the tongue 14 is drawn forwardly, the forward movement of the tongue 14 pivots the arms 18 of the lateral subframes 16 rearwardly and inwardly drawing the running gear together. When the retracted width of the trailer has been achieved in this manner the stop 109 will be engaged, the matched lock key holes for this position will be aligned, and the lock keys 60 will be positioned in the holes to lock the trailer at this width.

From this detailed description it will be understood that the invention is fully capable of achieving the objects and providing the advantages heretofore attributed to it.

I claim:

1. A variable width trailer comprising: a main frame;
   a pair of running gear supports disposed on opposite sides of said main frame, each having running gear thereon disposed in spaced parallel relationship;
   a lateral adjustment mechanism interconnected between said main frame and said wheel supports and disposed to vary the spacing between said running gear supports, and said wheel support sub-frame includes a hollow chassis box beam disposed to contain at least a portion of an axle beam with said axle beam pivotally connected to said chassis box beam for limited vertical swinging movement therein, said chassis box beam being interconnected with the distal end of one of said lateral subframes, and said running gear includes tandem wheels rotatably mounted on said axle beam in fore and aft alignment with said longitudinal axis of said wheel support sub-frame; and
   load bed means operatively associated with said main frame and disposed to support a load thereon.

2. A variable width trailer as described in claim 1, in which:
   said lateral adjustment mechanism includes a plurality of arms pivotally mounted to swing from an extended position where said running gear supports have a wide spacing to a retracted position where said running gear supports have a more narrow spacing.

3. A variable width trailer as described in claim 1, in which:
   said main frame includes a tongue member disposed parallel to said running gear;
   said running gear supports each include an elongated running gear support frame disposed parallel to said running gear; and
   said lateral adjustment mechanism includes two lateral subframes, one being disposed on each side of said tongue member and each having a pair of arms disposed in spaced parallel relationship with proximal ends pivotally connected to said tongue member and distal ends pivotally connected to one of said running gear support frames, said sub-frames each being swingable from an extended position where said running gear are widely spaced to a retracted position where said running gear are more narrowly spaced with parallelogram action which maintains said running gear parallel to said tongue member.

4. A variable width trailer comprising:
   a main frame having a forward end and a rearward end and a longitudinal axis disposed in alignment with the direction of travel of said trailer;
   a pair of wheel support sub-frames disposed on opposite sides of said main frame, said wheel support sub-frames each having a longitudinal axis disposed parallel with the longitudinal axis of said main frame, and running gear mounted thereon;
   a pair of lateral sub-frames disposed on opposite sides of said main frame and each interconnected with said main frame and a different one of said wheel support sub-frames, said lateral sub-frames each having proximal ends pivotally movable with respect to said main frame from an extended position substantially normal to said longitudinal axis of said main frame to a retracted position generally oblique with respect to said longitudinal axis, said lateral sub-frames each having alignment means disposed to maintain said longitudinal axis of said wheel support means parallel to said longitudinal axis of said main frame as irrespective of the position of said lateral sub-frames; and
   load bed means operatively associated with said main frame and said lateral sub-frames and disposed to support a load thereon, said load bed means includes a pair of main bed support members mounted on said main frame, a main frame load bed supported by said main bed support members, and a pair of sub-frame load bed members being pivotally movable from a generally horizontal load support position when said lateral sub-frames are in their extended position, to a stowed, generally vertical position when said lateral sub-frames are in their retracted position.

5. A variable width trailer as defined in claim 4, in which:
   said lateral sub-frames each include a pair of rigid arms disposed in parallel spaced relationship and each having a proximal end pivotally connected to one of said wheel support sub-frames whereby swinging said lateral sub-frame from said extended position to said retracted positions moves said arms to form a paralleogram and thereby maintain said wheel support sub-frame longitudinal axis parallel to said main frame longitudinal axis.

6. A variable width trailer comprising:

an elongated tongue member disposed in longitudinal alignment with the direction of travel of said trailer and having a forward end and a rearward end, said forward end having hitch means thereon;

a pair of wheel support sub-frames oppositely disposed in parallel spaced relationship, one on each side of said tongue member adjacent the rearward portion thereof, each of said wheel support sub-frames having running gear mounted thereon;

a pair of lateral sub-frames disposed on opposite sides of the rearward portion of said tongue member, each of said lateral sub-frame members having a pair of rigid arms disposed in parallel spaced relationship and having proximal ends pivotally mounted on said tongue member for generally horizontally swinging movement with respect thereto, and distal ends pivotally connected to a particular one of said wheel support sub-frames, said lateral sub-frames being pivotal from an extended position with said arms disposed substantially to said tongue member to a retracted position with said arms disposed rearwardly and oblique with respect to said tongue member, said arms of each of said lateral sub-frames being so interconnected with said tongue member and their respective wheel support sub-frame that said wheel support sub-frame remains substantially parallel to said tongue member during swinging movement of said lateral sub-frame from said extended position to said retracted position; and load bed means operatively associated with said tongue member and said lateral sub-frames and disposed to support a load on said trailer, said load bed means including a pair of lateral members disposed on each side of said tongue member forwardly of said lateral sub-frames and extending laterally outward from said tongue member, a main load bed member supported on each of said lateral members, and a pair of sub-frame load bed members supported on said lateral sub-frames.

7. A variable width trailer as described in claim 6, in which:

said lateral sub-frames each include a position lock interconnected with said arms and disposed to releasably lock said sub-frame in said extended and in said retracted position.

* * * * *